United States Patent
Diniz et al.

(10) Patent No.: US 8,365,471 B2
(45) Date of Patent: Feb. 5, 2013

(54) AUTOMATED TELESCOPING TOWER

(75) Inventors: Ronald L. Diniz, Fort Pierce, FL (US); Lowell Malo, Riverview, FL (US); Steve Fuhrman, Lakewood, CO (US); Craig A. Davis, Vero Beach, FL (US)

(73) Assignee: Aluma Tower Company, Inc., Vero Beach, FL (US)

( * ) Notice: Subject to any disclaimer, the term of this patent is extended or adjusted under 35 U.S.C. 154(b) by 303 days.

(21) Appl. No.: 12/698,084

(22) Filed: Feb. 1, 2010

(65) Prior Publication Data

US 2011/0185647 A1 Aug. 4, 2011

(51) Int. Cl.
*E04H 12/18* (2006.01)
(52) U.S. Cl. ............ 52/1; 52/111; 52/121; 52/632; 340/601
(58) Field of Classification Search ............ 52/1, 111, 52/121, 632; 340/601
See application file for complete search history.

(56) References Cited

U.S. PATENT DOCUMENTS

| | | | | | |
|---|---|---|---|---|---|
| 3,537,088 | A | * | 10/1970 | Wells | 340/601 |
| 3,606,713 | A | * | 9/1971 | Runquist | 52/115 |
| 3,616,692 | A | * | 11/1971 | Keller | 73/179 |
| 3,964,038 | A | * | 6/1976 | Rutherford | 340/601 |
| 4,011,752 | A | * | 3/1977 | Fowler | 73/170.11 |
| 4,034,174 | A | * | 7/1977 | McCord | 200/81.9 R |
| 4,203,707 | A | * | 5/1980 | Stepp | 416/119 |
| 5,046,290 | A | * | 9/1991 | Ishit et al. | 52/1 |
| 5,065,552 | A | * | 11/1991 | Kobori et al. | 52/1 |
| 5,101,215 | A | * | 3/1992 | Creaser, Jr. | 343/883 |
| 5,142,463 | A | * | 8/1992 | Panagotacos et al. | 362/285 |
| 5,557,892 | A | * | 9/1996 | Lavin | 52/121 |
| 5,570,546 | A | * | 11/1996 | Butterworth et al. | 52/111 |
| 6,032,080 | A | * | 2/2000 | Brisbane et al. | 700/71 |
| 6,099,139 | A | * | 8/2000 | Lapensee | 362/153.1 |
| 6,582,105 | B1 | * | 6/2003 | Christensen | 362/385 |
| 6,837,681 | B2 | * | 1/2005 | Wobben | 416/1 |
| 7,062,221 | B1 | * | 6/2006 | Christensen | 455/3.01 |
| 7,080,816 | B1 | * | 7/2006 | Vaccaro | 248/545 |
| 7,081,812 | B2 | * | 7/2006 | Hastings, Sr. | 340/456 |
| 7,476,006 | B2 | * | 1/2009 | Hinds | 362/286 |
| 7,574,832 | B1 | * | 8/2009 | Lieberman | 52/118 |
| 7,816,801 | B2 | * | 10/2010 | Guang et al. | 290/55 |
| 7,966,777 | B2 | * | 6/2011 | Douglas et al. | 52/118 |
| 7,989,979 | B2 | * | 8/2011 | Burgess et al. | 307/10.1 |
| 8,042,305 | B2 | * | 10/2011 | Pryor et al. | 52/121 |
| 8,157,522 | B2 | * | 4/2012 | Bolz | 416/35 |
| 8,183,707 | B2 | * | 5/2012 | Siebers et al. | 290/53 |
| 2004/0183687 | A1 | * | 9/2004 | Petite et al. | 340/601 |
| 2007/0038395 | A1 | * | 2/2007 | Green et al. | 702/62 |
| 2007/0046480 | A1 | * | 3/2007 | Stein | 340/601 |
| 2007/0187042 | A1 | * | 8/2007 | Kallstrom | 160/7 |
| 2008/0121133 | A1 | * | 5/2008 | Sousa Jaques | 104/173.2 |
| 2008/0250727 | A1 | * | 10/2008 | Hall et al. | 52/123.1 |
| 2010/0090463 | A1 | * | 4/2010 | Nies et al. | 290/44 |
| 2010/0102557 | A1 | * | 4/2010 | Ulanovskiy | 290/44 |
| 2010/0250139 | A1 | * | 9/2010 | Hobbs et al. | 702/6 |
| 2010/0313494 | A1 | * | 12/2010 | Ford | 52/111 |
| 2010/0314503 | A1 | * | 12/2010 | Ford | 248/70 |
| 2011/0033293 | A1 | * | 2/2011 | Cavalieri | 416/9 |
| 2011/0048651 | A1 | * | 3/2011 | Goth | 160/22 |
| 2012/0134804 | A1 | * | 5/2012 | Magnuson | 416/1 |

* cited by examiner

Primary Examiner — Robert Canfield
(74) Attorney, Agent, or Firm — Myers Wolin, LLC

(57) ABSTRACT

A telescoping tower comprising a sensor for monitoring an environmental condition, a processor for comparing the monitored environmental condition to a predetermined value, and an actuator for automatically retracting the telescoping tower if the environmental condition is equal to or greater than the predetermined value.

8 Claims, 5 Drawing Sheets

AUTOMATED TELESCOPING TOWER

FIELD OF THE INVENTION

The present invention relates to telescoping towers in general, and more particularly to a telescoping tower that automatically retracts in response to adverse environmental conditions.

BACKGROUND

Rapidly deployable telescoping towers are typically utilized to provide temporary communications, disaster recovery, testing, monitoring, surveillance, site survey and wireless data transfer functions to name a few. Such towers are generally constructed from aluminum or other lightweight materials for ease of transport and operation, and are often candidates for remote and/or unattended operations.

When such towers are deployed to areas where extreme inclement weather is prevalent, it is prudent to fully or partially retract the telescoping tower when winds rise to the point that the tower design limit is approached. If the tower is deployed in an unattended operation or the operator is temporarily away from the site, retraction of the tower will not take place and a potentially undesirable condition may develop. Once the retraction is made and the environmental (or other) danger has passed, it is desirable to have the tower to extend and return to its original operating condition.

SUMMARY

There is provided a telescoping tower comprising, in one embodiment, a sensor and control system that automatically monitors an environmental condition, such as wind speed, compares the monitored condition against a predetermined value, such as an over speed value, and automatically retracts the telescoping tower if the environmental condition is equal to or greater than the predetermined value. Once retracted, the system can, in one embodiment, automatically extend the telescoping tower when environmental conditions are no longer a concern. The system may be further provided with remote access, control and monitoring to provide for full command and control of any towers located anywhere in the world from anywhere in the world.

DETAILED DESCRIPTION OF THE PREFERRED EMBODIMENTS

Figure 1:
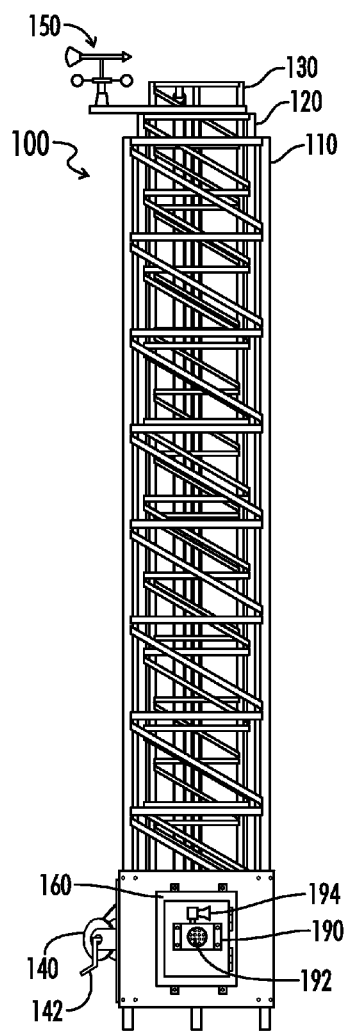
FIG. 1 is one embodiment of a telescoping tower of the invention in the fully retracted position.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
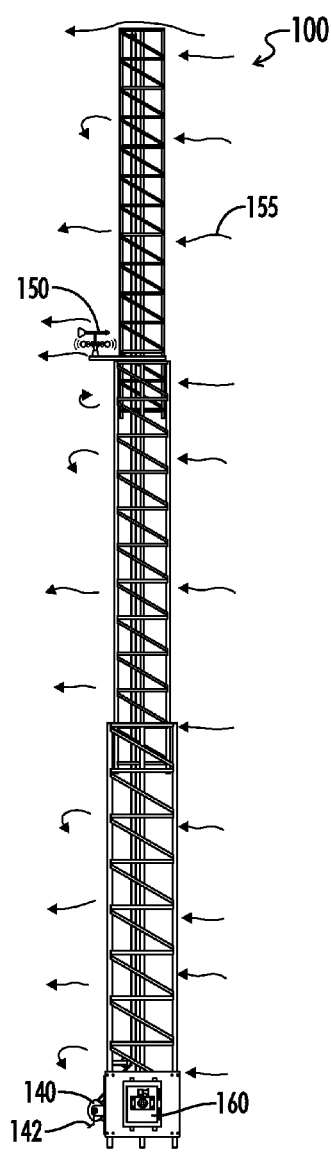
FIG. 2 is one embodiment of a telescoping tower in the fully extended position.
Figure 3:
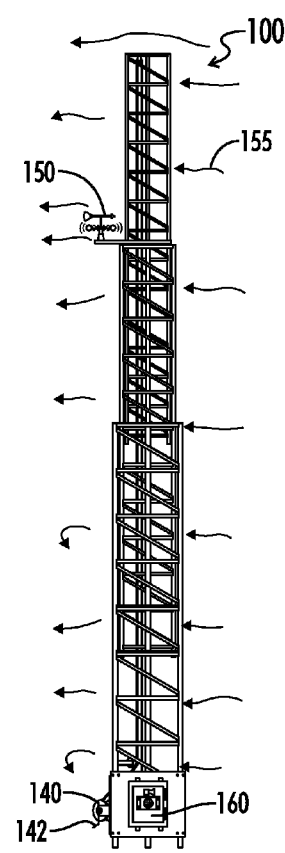
FIG. 3 is one embodiment of a telescoping tower in a partially retracted position.

FIG. 1-4 illustrate one embodiment of a telescoping tower 100 in accordance with aspects of the present invention comprising a plurality of telescoping tower sections 110, 120 and 130 slidably movable relative to each other and connected together by an actuator line (not shown) associated with an actuator 140. While FIG. 1 illustrates three tower sections, it will be appreciated that two tower sections or more than three tower sections are possible. In addition, while aspects of the this disclosure focus on a telescoping tower including relatively slidable telescoping sections, it will be appreciated that the system of the present invention can be utilized with towers that are raised and lowered using other than telescoping means. Furthermore, for purposes of discussion, the actuator 140 is referenced as a motor-powered winch that is anchored to the tower section 110 for extending and retracting the tower sections by automatic or manual operation as will be described below, although other methods of actuation are possible. An environmental sensor 150, such as heated ultrasonic wind sensor, for example, is attached to one of the tower sections for monitoring environmental conditions in the vicinity of the tower 100, where the environmental sensor 150 in the illustrated embodiment is an anemometer 150 that measures wind conditions 155 (FIGS. 2-3). Other sensors can be employed that measure other conditions such as, but not limited to, surveillance and intrusion monitoring. The environmental sensor 150 if FIG. 1 is connected to a control panel 160 that includes a processor or microprocessor 170, a mode switch 180 for controlling the operation of the telescoping tower 100, and an alarm 190 including a visual component 192 and an audio component 194 for alerting operators and people in the vicinity that the tower 100 is going to retract or extend. A power system 200 (FIG. 4) is provided for powering the components of the telescoping tower assembly 100 including, but not limited to, the actuator 140, sensor 150, processor 170, and alarm 190. The power system 200 can be connected to a direct current source such as household current, current from a nearby facility, generator or the like, and can be either 110 VAC or 12 VDC power, for example. Various options are available. For remote locations, a 12 VDC system with a solar battery charger may be preferred as a standalone back-up system.

The environmental sensor 150 measures an environmental condition such as wind speed, wind gusts and the like, to determine if the tower assembly 100 is being exposed to adverse environmental conditions that might damage or otherwise impair the operation of the tower. Rapidly deployable, lightweight telescoping towers are typically designed to withstand certain wind conditions in a fully extended position before partial or complete retraction becomes necessary. For example, exposure to a certain wind speed, such as 50 mph for example, for a certain period of time, such as 30 minutes for example, might overstress a fully extended tower assembly 100 such that partial retraction of tower sections 120 and/or 130 relative to tower section 110, or complete retraction of tower sections 120 and 130 into tower section 110, becomes necessary to protect the integrity of the tower section 100 and prevent damage to the tower sections 110, 120, 130 and/or any sensors or other monitoring equipment situated thereon. An operator of the tower assembly can establish predefined environmental conditions, or in the present example combinations of wind speed and duration, depending on a variety of factors including, but not limited to, tower material and/or weight, height of the tower sections, the actuator assembly connection, the anchoring system used to anchor the tower assembly to a support structure or to the ground, the type of sensor or other equipment attached to the tower, or combinations of the same. If the sensor 150 measures a condition that is equal to or greater than a certain predefined environmental condition as compared by the processor 170, then in an automated operation as described below the processor 170 would cause the actuator 140 to partially or fully retract the tower assembly 100 until the sensor 150 measures an environmental condition that is below the certain predefined condition. Once the adverse environmental condition dissipates, the processor 170 would cause the actuator 140 to return to the tower assembly 100 to an extended condition awaiting further instruction from an operator or until adverse conditions require another partial or full retraction.

Figure 4:
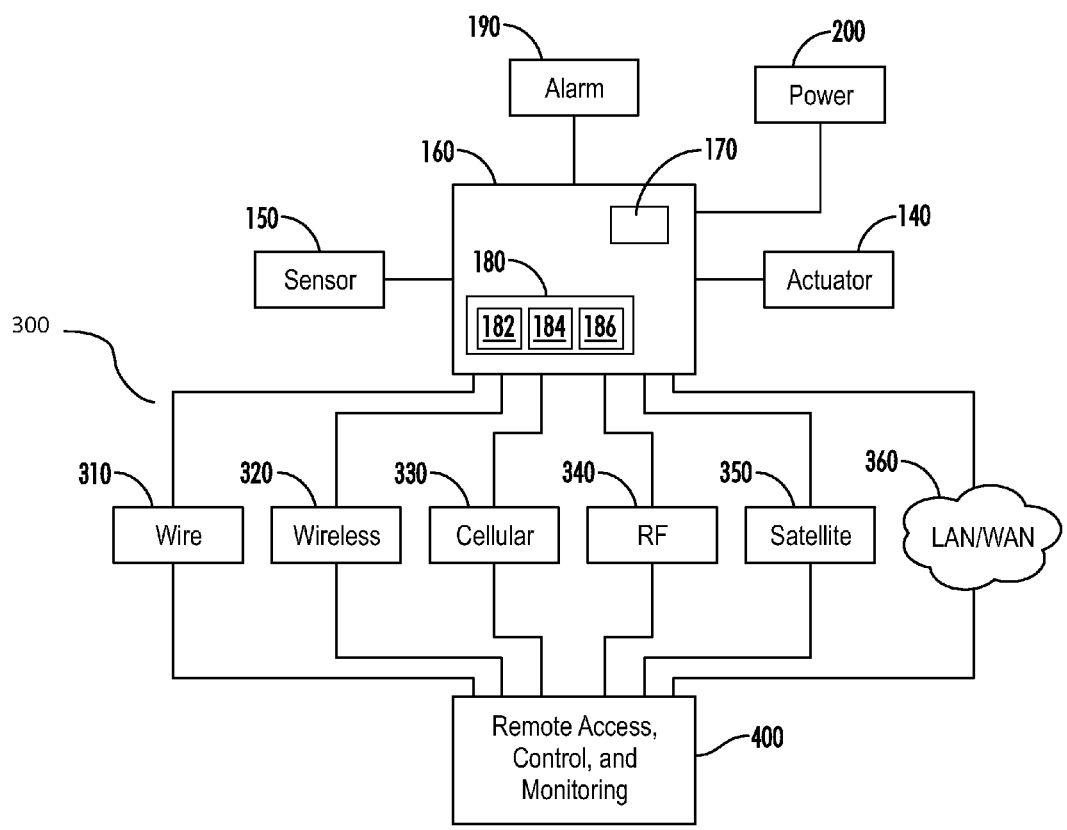
FIG. 4 illustrates one embodiment of a control diagram incorporating elements of the invention.

It is preferable when the tower assembly 100 is deployed in an unattended operation or a remote location for the control panel 160 to be accessed remotely through some form of communication means 300. For example, as shown in FIG. 4 for example, to provide full command and control, links to a remote control center anywhere in the world can be established through hard wire 310, wireless 320, cellular 330, RF (radio frequency) link 340, satellite 350 or other communications means. For example, the control panel 160 could be connected through a network 360 such as a LAN (local area network) or a WAN (wide area network) to a remote operator interface 400 that could remotely monitor the operation of the tower assembly 100, the sensor output, the actuator operation and the like, and that could remotely access and control the control panel 160 and other tower systems in general if desired. Cameras and other visual monitoring equipment could be integrated into the tower assembly and hooked into the control panel 160 for providing a remote user with enhanced visual observation of the tower assembly and also ambient environmental conditions. If a remote operator desired to retract the tower assembly 100 absent any adverse environmental conditions, then the operator could bypass the sensor control system and directly cause the actuator 140 to retract or extend the tower assembly 100 as desired. The control panel 160 could also receive instructions based on external sources of information such as, for example, weather advisories from the National Weather Service (NWS). For example, if the tower assembly 100 is situated in a certain zip code, and the NWS issues a tornado warning or hurricane alert for such zip code, then such warning or alert could trigger the processor 170 to retract the tower assembly 100 while such alert is in effect, and to extend the tower assembly when such alert is no longer active.

The control panel 160 is further provided with a mode switch 180 that is controlled by the processor 170 and preferably has a first mode 182, a second mode 184 and a third mode 186 that are designated in the embodiment described herein as the "Off", "Manual", and "Automatic" modes respectively. While such modes 182, 184 and 186 are shown in FIG. 4 in a certain order, it will be appreciated that other positioning is possible with departing from the functionality of the mode switch. In addition, while the switch 180 is accessible directly at the control panel 160, remote control and operation of the switch 180 as described above is possible.

In one embodiment, the "Off" mode 182 disables the control system so that no power is supplied to the control panel or the actuator 140, requiring the actuator 140 to be operated manually or by hand using an actuator handle 142 or the like.

If the tower 100 is supplied with a dual mode actuator or winch that allows the winch to be operated mechanically, the tower 100 may be extended or retracted by inserting a crank into the winch 140. The "Off" mode is preferable while the tower 100 is being manually adjusted, maintained, repaired or otherwise being worked on by company personnel or the like.

In one embodiment, the "Manual" mode 184 allows an operator to manually control the operation of the actuator 140, with power being supplied to the actuator 140, to raise or lower the tower 100 to the desired height. Once fully extended or retracted, limit switches (not shown) will deactivate the winch to prevent damage to the tower or lifting system. This manual operator control can occur on site through direct access to the control panel 160, or remotely through remote access to the control panel through a communication means 300.

Figure 5:
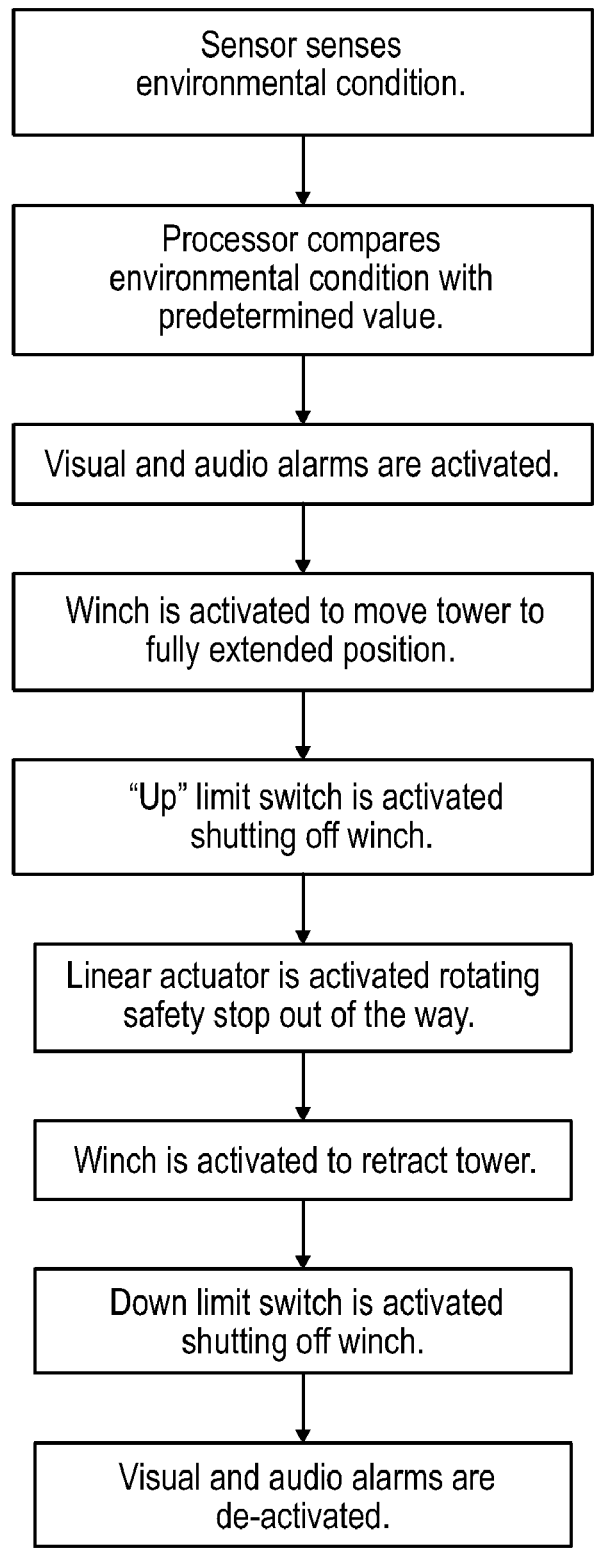
FIG. 5 illustrates one embodiment of an automatic retraction of a telescoping tower.
Figure 6:
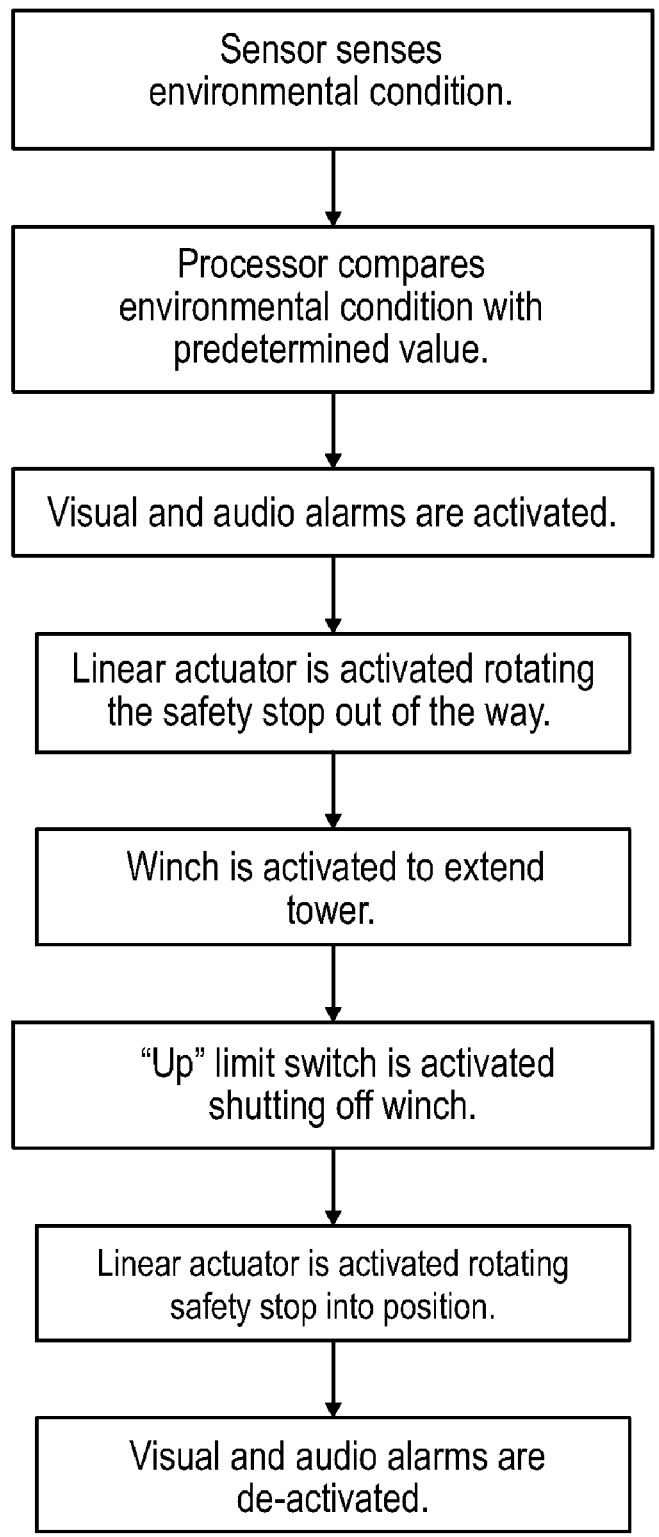
FIG. 6 illustrates one embodiment of an automatic extension of a telescoping tower.
Figure 7:
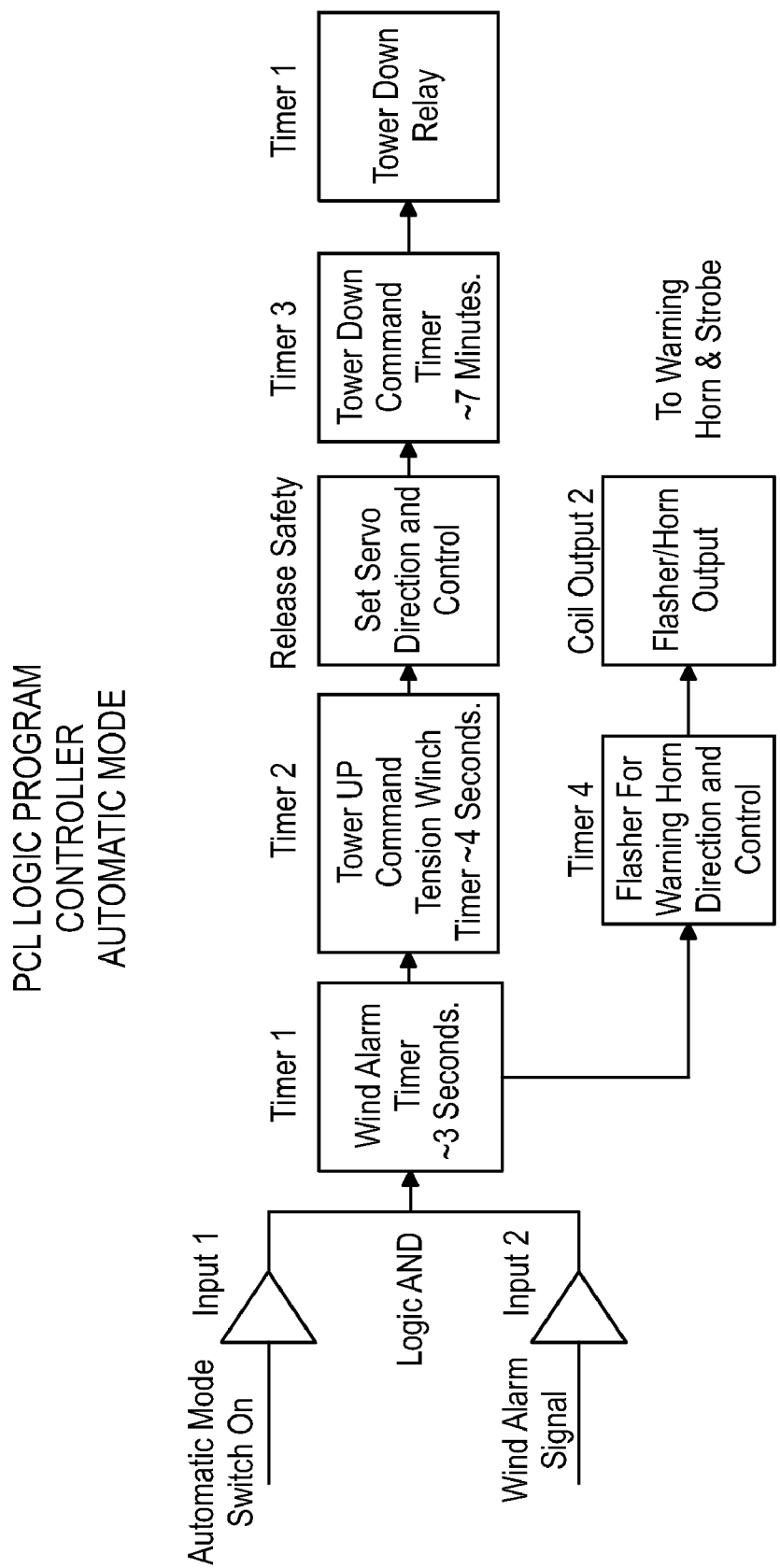
FIG. 7 illustrates one embodiment of a logic program for a controller exhibiting an automatic mode.

In one embodiment in the "Automatic" mode as shown in FIGS. 5-7, the sensor 150, such as an anemometer for example, senses the wind speed and, when a predefined speed is met or exceeded for a certain period of time, a set of normally open contacts close. Closure of these contacts begins a series of events. First, the alarm 190 is activated, which preferably includes a light 192 and a horn 194 for warning personnel in the area that the tower 100 is about to retract or extend. While workers generally should have put the mode switch 180 into the "Off" mode 182 prior to working on the tower, they may have forgotten to do so. Generally, the alarm 190 will be set for thirty seconds allowing ample time for workers to clear the area. After the warning period is over, the winch 140 is preferably activated to move the tower 100 to the fully extended position (FIG. 2) in case it has come down and rests on the safety stop. An "up" limit switch is activated shutting off the winch 140. A linear actuator is activated rotating the safety stop out of the way and then the winch 140 is activated to move the tower to a partially (FIG. 3) or more preferably a fully retracted (FIG. 1) position. Thereafter, a "down" limit switch is activated shutting off the winch 140 and then the alarm 190 is de-activated.

Returning the tower from a retracted position to an extended position is illustrated, in one embodiment, in FIG. 6. While the tower is in the retracted position, the sensor 150 senses an environmental condition, such as wind speed, for a predetermined amount of time, that is at or below the environmental condition or wind speed that triggered the tower retraction described above. For example, if retraction of a fully extended tower is caused by a fifty mph wind speed or wind gust, then resumed extension of a fully retracted tower might only occur if the wind speed does not exceed forty mph over a thirty minute period. Setting the environmental condition of the extension trigger at or below the environmental condition of the retraction trigger ensures that the extension of the tower takes place during safe environmental conditions relative to the environmental conditions that resulted in the retraction of the tower. Alternately, a remote command may be given from a remote location 400 (FIG. 4) to override the system and raise the tower. Thereafter, the alarm 190 is activated for a period of time to allow ample time for workers to clear the area. The linear actuator is activated rotating the safety stop out of the way, and the winch is activated to move the tower to the fully extended position. Thereafter, the "up" limit switch is activated shutting off the winch, the linear actuator is activated rotating safety stop into position, and the alarm 190 is de-activated.

The telescoping tower system of the present invention can be implemented in a variety of different phases depending on, for example, user demands and system cost. One relatively simple implementation would only allow an automated retraction of the tower assembly, with a manual reset required thereafter to raise or extend tower. A next stage implementation would provide a fully automatic operation of lowering and raising the tower. A fully integrated implementation would provide a fully automated system with remote access, control and monitoring of all system functions. In urban areas, for example, the remote connection may be via wireless connection. In remote areas, it can be via satellite phone or other means. The fully integrated implementation will allow remote monitoring and control of towers located anywhere in the world from anywhere in the world.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

Most preferably, aspects of the invention including the control system, processor or microprocessor, may be implemented as any combination of hardware, firmware and software. Moreover, software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A telescoping tower comprising:
a) an anemometer for monitoring a wind speed;
b) a processor for comparing the monitored wind speed to a first predetermined value;
c) a timer for measuring a duration which the wind speed is equal to or greater than the first predetermined value; and
d) an actuator for automatically retracting the telescoping tower if the wind speed is equal to or greater than the first predetermined value for a duration longer than a predetermined period.

2. The telescoping tower of claim 1, further comprising a control system for controlling the movement of the telescoping tower.

3. The telescoping tower of claim 2, wherein the control system is remote from the telescoping tower.

4. The telescoping tower of claim 3, wherein the telescoping tower is connected to the control system by at least one of a hard wire, wireless, cellular, RF (radio frequency) link, satellite communications or through a network.

5. The telescoping tower of claim 1, wherein the actuator is a winch attached to the telescoping tower.

6. The telescoping tower of claim 1, further comprising an audible or visual alarm that is triggered prior to the retraction of the telescoping tower.

7. The telescoping tower of claim 1, wherein the actuator automatically extends the retracted tower if the wind speed is equal to or less than a second predetermined value.

8. The telescoping tower of claim 7, wherein the second predetermined value is equal to or less than the first predetermined value.

* * * * *